Patent [19] 3,905,303
Dull    Sept. 16, 1975

[54] SWITCH FOR A MAGNETIC SUSPENSION RAILROAD

[75] Inventor: Hans-Jurgen Dull, Erlangen, Germany

[73] Assignee: Siemens Aktiengesellschaft, Munich, Germany

[22] Filed: Nov. 16, 1973

[21] Appl. No.: 416,368

[30] Foreign Application Priority Data
Nov. 17, 1972   Germany.......................... 2256608

[52] U.S. Cl. .......................... 104/130; 104/148 MS
[51] Int. Cl.² .......................................... E01B 23/06
[58] Field of Search ...................... 104/130, 148 MS

[56] References Cited
UNITED STATES PATENTS

| | | | |
|---|---|---|---|
| 3,774,544 | 11/1973 | Mouillon | 104/130 |
| 3,782,291 | 1/1974 | Maison | 104/130 |
| 3,797,402 | 3/1974 | Karch | 104/148 MS |

Primary Examiner—M. Henson Wood, Jr.
Assistant Examiner—Reinhard J. Eisenzopf
Attorney, Agent, or Firm—Kenyon & Kenyon Reilly Carr & Chapin

[57] ABSTRACT

An improved switch for a magnetic suspension railroad of the type having secondary reaction members mounted on the roadbed which cooperate with primary conductor loops in a vehicle to provide support, guidance and/or propulsion of the vehicle, in which the secondary support members are mounted on double lever arms which are rotatable between one position for straight ahead travel and a second position for switched or curved travel.

2 Claims, 9 Drawing Figures

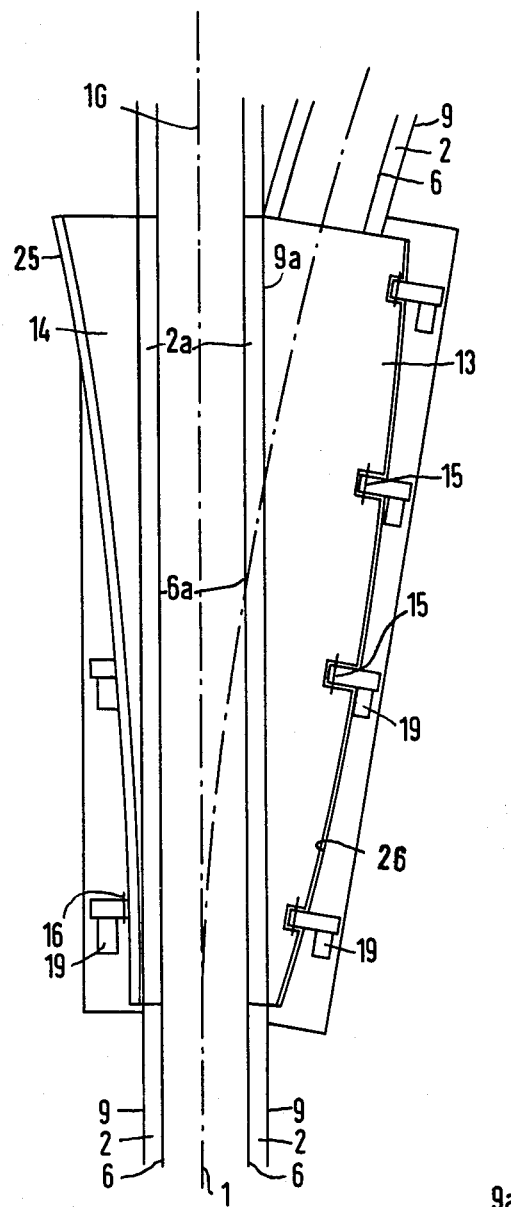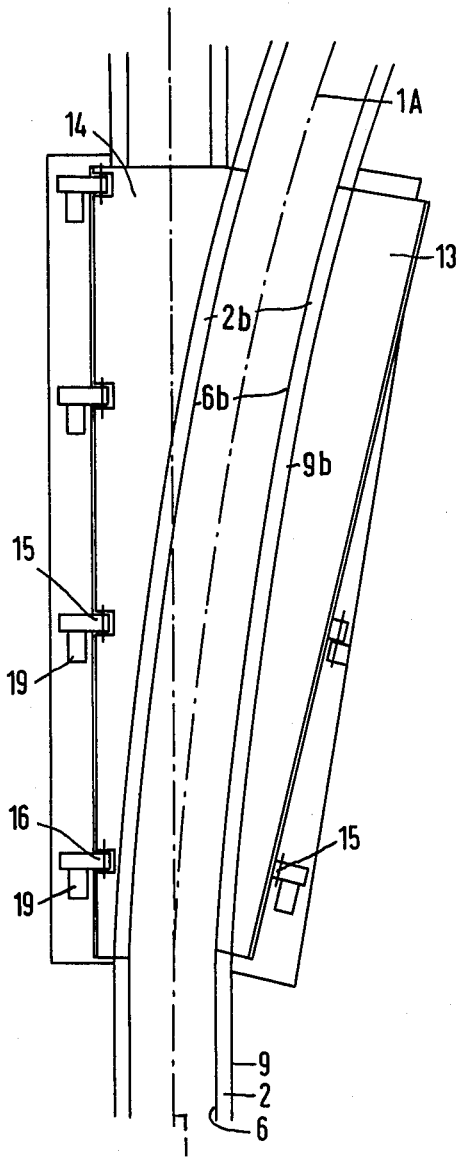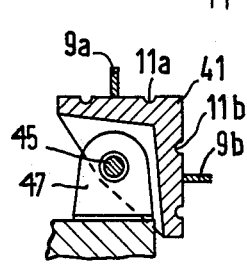
Fig. 2b
Fig. 4
Fig. 2d

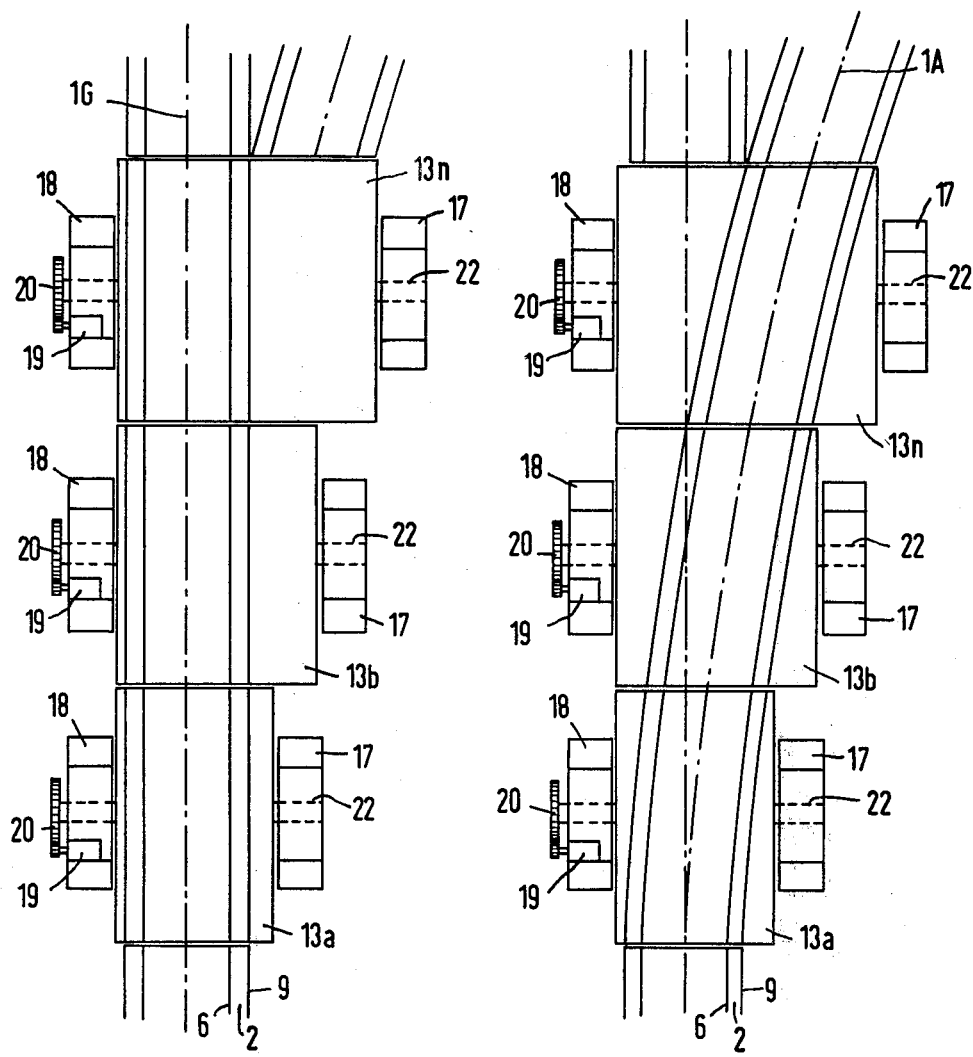
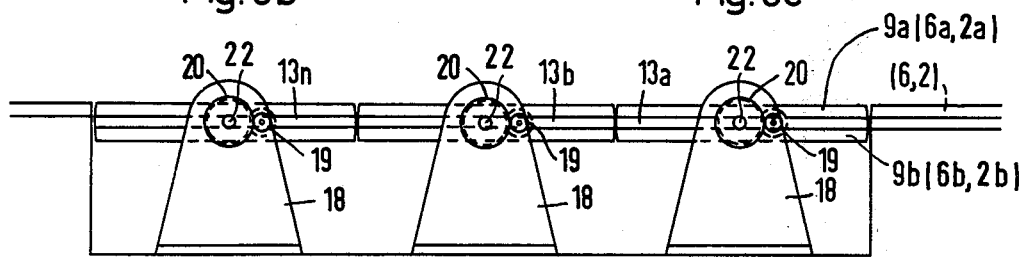
Fig. 3b  Fig. 3c
Fig. 3a

SWITCH FOR A MAGNETIC SUSPENSION RAILROAD

BACKGROUND OF THE INVENTION

This invention relates to magnetic suspension railroads in general and more particularly to an improved mechanically settable switch for such railroads.

Magnetic suspension railroads are known in the art, in which current carrying loops located within the vehicle cooperate with reaction members such as rails, plates or loops on the roadbed to generate lifting, guidance and propulsion forces. Because these reaction members generally extend above the lower extremities of the vehicle travelling thereon, difficulties are encountered in the area of switches. One type of switch for use in magnetic suspension railroads is disclosed in the publication Model Paper "The Magnet Plane: Guided Electro Magnetic Flights" by H. Kolm and Richard D. Thornton, Massachusetts Institute of Technology, Cambridge, Massachusetts, published May 1, 1972 pp. 7-8. In the switch disclosed therein, a section of the track of a magnetic suspension railroad i.e. the portion containing the secondary reaction members, about one mile long is mounted on sliding support bearings so as to be able to make a connection with a second or third track. Clearly, a design of this nature is complex and extremely costly.

Another proposed system uses supplemental magnetic systems in the switch area in order to guide the vehicles therethrough. A system of this nature is disclosed in a publication by Messerschmitt-Boelkow-Blohm entitled "Development of a RapidTransit System", Chapter Roadbed, Switch Concept. In this system, stationary magnets are mounted on the roadbed and armature bars on the vehicle in order to produce the necessary lifting forces in the area of the switch. To obtain lateral guidance, additional electromagnets, which along with the guidance electromagnet of the train generate repulsion forces, are mounted at the outer guide rails of the switch. Although switches of this nature operate without the need of mechanical setting elements, track guidance in the curved portion of the switch presents serious problems particularly due to the unequal centrifugal forces thereby requiring special measures to maintain the required safety since several changes of the track guidance system are involved. Thus, it can be seen that there is a need for a better system for switching magnetically suspended vehicles, which system is less expensive, safer and simple to operate.

SUMMARY OF THE INVENTION

The present invention provides such a system by mounting the secondary reaction members associated with the roadbed on double levers in the area of the switch. These secondary reaction members, which may be secondary magnets, conductor loops or conductor plates will be identical to those on the rest of the line. Thus, the same guidance system is used within the switch as is used on straight sections of track. Swinging the double lever from one position to the other will cause either a curved section or a straight section of track to be connected thus, allowing the vehicle to either travel straight ahead or turn off on the curved switch. In one embodiment, a double lever which is pivoted along an axis parallel to the direction of travel is shown and in another embodiment a double lever pivoting about an axis transversed to the direction of travel is shown. The arrangement of the present invention permits accurate track guidance without requiring expensive control devices and assures a high degree of operational safety. As illustrated, an emergency track system can be located in the center of the roadbed, for example, a wheel and rail system as with conventional switches. The invention although shown primarily with a bi-lateral arrangement of secondary reaction members for propulsion guidance and suspension can be equally well used with the type system which uses a central secondary reaction member for this purpose. An example of such an embodiment is shown. When compared to the design mentioned above wherein the entire track is moveable in the area of the switch, the present system permits a substantial reduction in the amount of mass which must be moved and a decreased dependence on weather influences. Additionally, banked design of the curved branch is possible without additional expenditure.

BRIEF DESCRIPTION OF THE DRAWINGS

FIG. 2b is a plan view of the switch in the position of FIG. 2a.

FIG. 2d is a plan view of the switch set as in FIG. 2c.

FIG. 3a is a side view of a second embodiment of the present invention with the switch set for straight travel.

FIG. 3b is a plan view of the switch setting of FIG. 3a.

FIG. 3c is a plan view similar to that in 3b showing the switch set for travel on the curved branch.

FIG. 4 illustrates a further embodiment for use with a central secondary reaction member.

DETAILED DESCRIPTION OF THE PREFERRED EMBODIMENT

Figure 1:
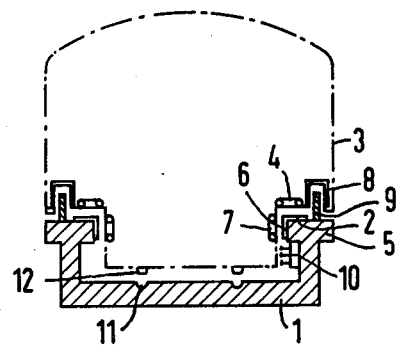
FIG. 1 is a cross-section of the roadbed of a magnetic suspension railroad showing the arrangement on a straight section of track.

FIG. 1 illustrates a cross-section through a straight portion of roadbed on a magnetically suspended railroad. The roadbed generally designated 1 has on each side a support member 5 on which are supported secondary reaction members or conducting plates 2. These conducting plates 2 cooperate with current carrying loops 4 in the vehicle which will preferably be made up of superconductors, to generate lifting forces. Also mounted to the supports 5 are conductor plates 6 which cooperate with conductor loops 7 in the vehicle to generate lateral guidance forces. Atop the supports 5 on each side are vertical secondary reaction members or reaction rails 9 which cooperate with the current carrying conductor loops 8 in the vehicle, the conductor loops 8 being the stator of a linear motor used to generate propulsion forces. Also shown mounted to one side of the support 5 are power rails 10 used for supplying power to the vehicle 3. As illustrated, the roadbed has track grooves 11 which match wheels 12 on the vehicle in order to permit starting and landing of the vehicle 3. Typically, wheels 12 will be retractable and will be lower only during startup or landing when the vehicle will run on the wheels in the grooves.

Figure 2A:
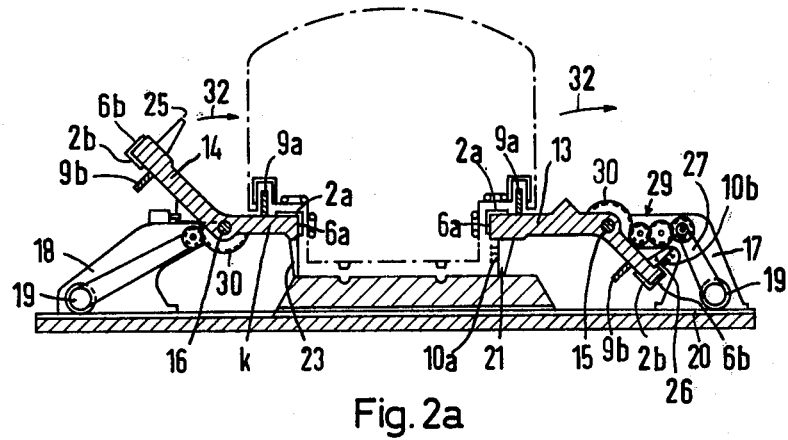
FIG. 2a is a cross-section of the switching arrangement of the present invention with the switch set for straight travel.

FIG. 2a illustrates a first embodiment of the switch of the present invention with the switch set for straight ahead travel. As is evident from FIG. 2, all of the secondary reaction members formerly found on the straight portion of track are still present in similar positions so as to match those of the straight portion. Thus, there is shown, the reaction rail 9a, the suspension plate 2a and the guidance plate 6a in addition to the power rails 10a on each side of the roadbed. However, instead of being solidly mounted to a support 5 as in FIG. 1, these members are now mounted on one end of a lever arm 13 and a lever arm 14. On the other ends of arms 13 and 14 are found similar members 9b, 2b and 6b for use on the curve section of track as will be more clearly seen below. The arm 13 is pivoted about a axes 15 in a support 17 at the side of the roadbed. A similar arrangement is provided on the other side of the roadbed with the lever arm 14 pivoting about axes 16.

A stop 21 is placed on the end of lever arm 13 which rests against the roadbed to properly position the reaction members so that they match up what the corresponding members outside the switch. Similarly, a member 23 is provided as a stop for the lever 14. Lever 14 may also be supported at a point K if desired. A plan view of the arrangement of FIG. 1 is shown on FIG. 2b wherein the straight section of track 1 is coupled with another straight section of track 1G. FIG. 2b illustrates the pivot axes 15 and 16 about which the arms 13 and 14 respectively rotate. In addition, shown more clearly on FIG. 2b are motors 19 used for driving the switch, along with exposed unused stop members 25 and 26 to be described below. As can be seen more clearly from FIG. 2a, motor 19 is coupled through a chain and sprocket drive 27 or the like to a plurality of gears 29 which drive a gear 30 ridgidly attached to the respective lever arms 13 and 14. The additional gears 29 on the right hand side of FIG. 2a are interlocked so that the various motors 19 drive together.

Figure 2C:
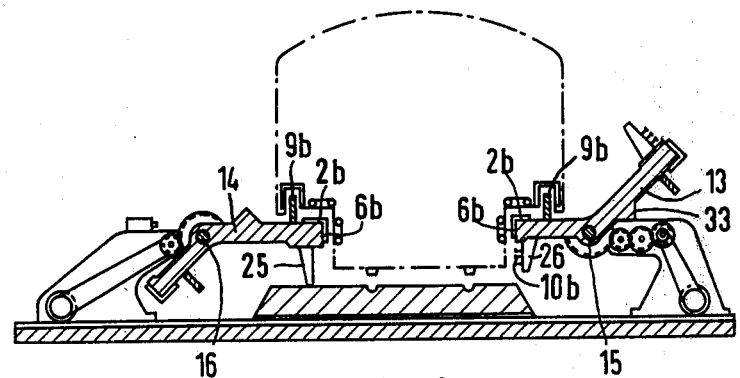
FIG. 2c is a cross-section of the switch area with the switch set for travel in the curved branch.

In going from straight ahead operation i.e. in coupling tracks 1 and 1G of FIG. 2b, to coupling the track 1 to the track 1A as shown on FIG. 2d, the two lever arms will be rotated in the direction of arrows 32. The result after completion of this rotation is illustrated by FIG. 2c. The arm 14 is now in a position with its stop 25 resting against the roadbed. The plates 9b, 2b and 6b are now in alignment with corresponding plates of the straight section of track. On the other side, the arm 13 rests against a stop 33 or, as in the embodiment above, the roadbed may be extended so that the stop 26 rests thereon. Similarly, the other set of reaction members 2b, 6b and 9b on lever arm 13 are now properly positioned as are the power rails 10b. A plan view of this setting is illustrated in FIG. 2d.

In the embodiment just described, the double lever arms were rotated about an axis parallel to the direction of travel, with a lever arm being provided on each side of the track. FIGS. 3a, 3b and 3c illustrate an embodiment in which rotation takes place about an axis which is transverse to the track. As illustrated by FIG. 3a, a plurality of plates designated 13a, 13b and 13n, with the n indicating that a greater plurality than the three shown may be used, are mounted for rotation about axels or axes 22 as shown more clearly on FIG. 3b. One side of the plate, the top for the illustrated setting of FIG. 3a, has the members 9a, 6a and 2a needed for straight ahead travel onto the straight section of track 1G, whereas the other side of the plate contains the members 9b, 6b and 2b for travel on the curved section of track 1A. In terms of the previous embodiment, each of the plate members 13a, 13b and 13n may be thought of as comprising double lever arms extending from the axis 22. Motors 19 with gears thereon drive gears 20 coupled to axels 22 secured to each of the plates to rotate them through 180°. As illustrated by FIG. 3b, in the position shown by FIG. 3a the members 9a, 6a and 2a are in a straight line permitting travel on to the straight section of track 1G. Rotation of each of the members 13a, 13b and 13n through 180° will result in the arrangement shown on FIG. 3c wherein the vehicle will now be coupled to the curved track 1A. The members 13a, 13b and 13n have their axels 22 supported in conventional bearing means held in supports designated 17 and 18 to correspond to the support designations of FIG. 2.

In cases where the secondary reaction members are located along the center lines, such as the line 1 or 1G of FIG. 2b an arrangement such as that shown on FIG. 4 may be used. Although this arrangement shows only the linear motor reaction rail 9, the remaining reaction members 2 and 6 could also be mounted thereon. In such a case, the reaction members will be appropriately shaped and mounted to a rotatable roadbed member 41 containing grooves 11a for straight ahead travel and grooves 11b for curved travel. The support roadbed member 41 will contain the reaction rails 9a for straight ahead travel and 9b for curved travel along the other secondary reaction members if installed. The whole arrangement will be rotatably supported on an axel 45 which is supported in conventional bearings within a plurality of blocks 47. In a fashion similar to that described above, motors will be provided for rotating the support 41 between the position shown for straight ahead travel and a position 90° therefrom for curved travel. As in the previous embodiments, a double armed support member that member being the roadbed support 41, is provided, which double arm support member is rotated to change over from straight to curved travel.

Thus, an improved switch for use in magnetic suspension railroads has been shown. Although specific embodiments have been illustrated and described, it will be obvious to those skilled in the art that various modifications may be made without departing from the spirit of the invention which is intended to be limited solely by the appended claims.

What is claimed is:

1. An improved mechanically settable switch for a magnetic suspension railroad of the type wherein primary conductor loops on each side of a vehicle react with secondary reaction members on each side of the roadbed to generate at least one of support, guidance and propulsion forces comprising:

a. first and second double lever arms on opposite sides each containing first and second arms rotatable about an axis parallel to the direction of travel having mounted on the first arm secondary reaction members identical to those on the main portion of the railroad and arranged to provide straight ahead travel and on the second arm similar reaction members arranged to provide for curved travel, said double lever arm arranged so that it mates with the main section of the track; and b. means for rotating said double lever arm between a first position wherein the reaction members on said first arms are aligned with the main track and a second position wherein the secondary reaction members on said second arms are aligned with said main track.

2. An improved mechanically settable switch for a magnetic suspension railroad of the type wherein primary conductor loops on each side of a vehicle react with secondary reaction members on each side of the roadbed to generate at least one of support guidance and propulsion forces comprising:

a. at least one planar member having mounted, on a first side thereof, secondary reaction members identical to those on the main portion of the railroad and arranged to provide for straight ahead travel and, on the second, opposite side thereof secondary reaction members arranged to provide for curved travel said planar member being mounted so that it mates with a main section of track; and b. means for supporting said planar member on an axis through its center, said axis being transverse to the direction of travel whereby rotation through 180° will result in a change for straight ahead to curved travel.

* * * * *